W. H. FOSTER & I. C. ROBERTS.
Churning Apparatus.
No. 209,392. Patented Oct. 29, 1878.
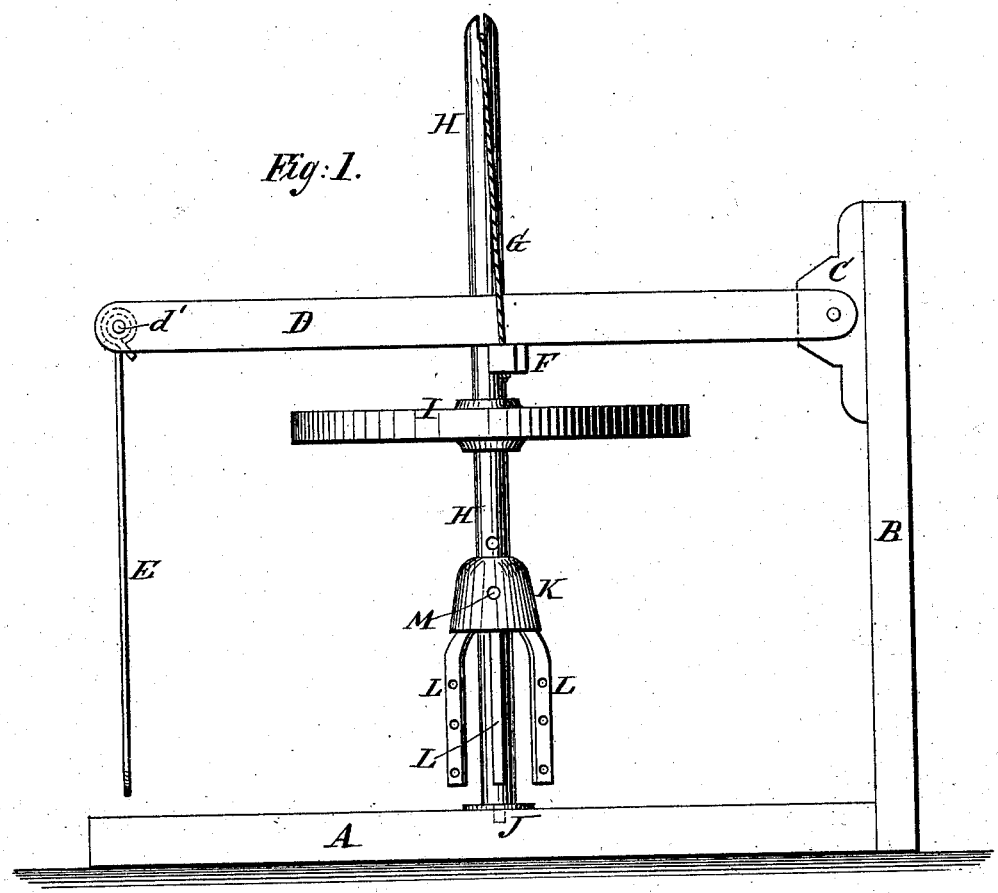
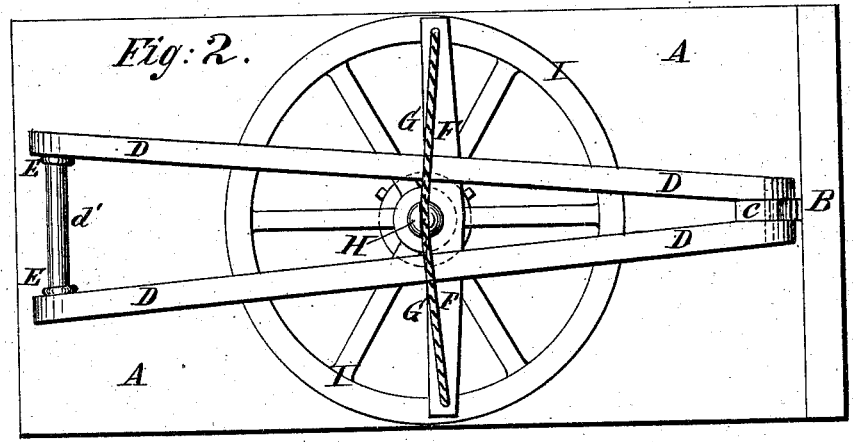

UNITED STATES PATENT OFFICE.

WILLIAM H. FOSTER AND ISAAC C. ROBERTS, OF LOUISBURG, KANSAS.

IMPROVEMENT IN CHURNING APPARATUS.

Specification forming part of Letters Patent No. 209,392, dated October 29, 1878; application filed August 6, 1878.

*To all whom it may concern:*

Be it known that we, WILLIAM HILL FOSTER and ISAAC CORWIN ROBERTS, of Louisburg, in the county of Miami and State of Kansas, have invented a new and useful Improvement in Churning Apparatus, of which the following is a specification:

Figure 1 is a side view of our improved churning apparatus. Fig. 2 is a top view of the same.

Similar letters of reference indicate corresponding parts.

The object of this invention is to furnish an improved churning apparatus which shall be simple in construction, inexpensive in manufacture, convenient in use, easily operated, and effective in operation, bringing the butter very quickly, and at the same time gathering it.

The invention consists in the combination of the pivoted lever, provided with the cross-bar and the cord, and the balance wheel, with the shaft of a churn-dasher, and in the combination of the pivoted lever, provided with the cross-bar and the cord, the stirrup, and the balance-wheel, with the shaft of a churn-dasher, as hereinafter fully described.

A represents the floor, and B represents the wall, of a room. To the wall B is attached a bracket, C, to which is pivoted the end of a lever, D.

The lever D is made double, and the outer ends of its parts are connected by a round, $d'$, which serves as a handle when the machine is to be operated by hand.

To the round $d'$ are pivoted the ends of a U-shaped rod, E, which serves as a stirrup when the machine is to be operated by the foot.

To the middle parts of the lever D is firmly attached the middle part of a cross-bar, F, to the ends of which are attached the ends of a cord, G.

The outer side of the center of the cross-bar F has a half-round notch formed in it, to serve as a bearing for the dasher-shaft H. In the upper end of the dasher-shaft H is formed a notch to receive the center of the cord G.

To the dasher-shaft H, below the lever D and above the top of the churn, is rigidly attached a fly-wheel, I, the size of which should be varied, according to the size of the churn and the quantity of milk to be churned at a time. The lower end of the dasher-shaft H revolves upon a pivot, J, to be attached to the center of the churn-bottom.

Upon the lower part of the dasher-shaft H is placed a hub, K, to the lower side of which are attached four (more or less) arms, L, which incline outward to a distance proportioned to the size of the churn-body, and then extend downward vertically. The arms L have holes formed through them for the passage of milk, so as to produce more friction upon it and bring the butter quicker.

The dasher-hub K is secured to the dasher-shaft H detachably by a pin, M, which passes through a hole formed in it, and through a hole in the dasher-shaft H. Several holes are formed in the dasher-shaft H to receive the pin M, so that the dasher K L may be adjusted higher or lower, as the quantity of milk to be churned may require.

When the apparatus is not in use the lever D may be turned up against the wall B, so as to be entirely out of the way.

In using the machine the dasher K L is detached from the shaft H, which shaft is then passed through the hole in the churn-cover, and the dasher is again attached to it, and is then placed in the churn-body; or the churn-cover may be made in two parts or halves, in which case it will not be necessary to remove the dasher K L. The lever D is then lowered over the dasher-shaft, and the churn is adjusted to bring the said dasher-shaft into the notch in the cross-bar F. The center of the cord G is then placed in the notch in the upper end of the dasher-shaft H.

In operating the machine, the wheel I is turned by hand to wind the slack of the cord G around the upper part of the dasher-shaft H, which raises the free end of the lever D. The free end of the lever D is then forced downward by the hand or foot, which unwinds the cord G and rotates the dasher, giving sufficient momentum to again wind up the cord G, so that a reciprocating revolution will be given to the dasher by successive downward movements of the lever D.

Having thus described our invention, we claim as new and desire to secure by Letters Patent—

1. The combination of the pivoted lever D, provided with the cross-bar F and the cord G, and the balance-wheel I, with the shaft H of a churn-dasher, substantially as herein shown and described.

2. The combination of the pivoted lever D, provided with the cross-bar F and the cord G, the stirrup E, and the balance-wheel I, with the shaft H of a churn-dasher, substantially as herein shown and described.

WILLIAM H. FOSTER.
ISAAC C. ROBERTS.

Witnesses:
J. B. COWEN,
DANIEL I. CAPPER.